US007057725B2

(12) United States Patent
Stewart

(10) Patent No.: US 7,057,725 B2
(45) Date of Patent: Jun. 6, 2006

(54) METHODS OF INSPECTING FLEXOGRAPHIC AND THE LIKE PRINTING PLATES

(75) Inventor: Gary Laurance Stewart, Hendon (GB)

(73) Assignee: X-Rite, Ltd., Poynton (GB)

( * ) Notice: Subject to any disclaimer, the term of this patent is extended or adjusted under 35 U.S.C. 154(b) by 226 days.

(21) Appl. No.: 10/258,325

(22) PCT Filed: May 11, 2001

(86) PCT No.: PCT/GB01/02075

§ 371 (c)(1),
(2), (4) Date: Mar. 3, 2003

(87) PCT Pub. No.: WO01/88613

PCT Pub. Date: Nov. 22, 2001

(65) Prior Publication Data

US 2003/0164943 A1 Sep. 4, 2003

(30) Foreign Application Priority Data

May 15, 2000 (GB) ................................ 0011702.8

(51) Int. Cl.
*G01B 11/00* (2006.01)
*G01N 21/55* (2006.01)

(52) U.S. Cl. ....................................... 356/397; 356/445

(58) Field of Classification Search .. 356/237.1–237.5, 356/239.1–239.4, 397, 445–448; 101/484, 101/456; 250/458.1
See application file for complete search history.

(56) References Cited

U.S. PATENT DOCUMENTS 4,149,187 A * 4/1979 Palmer et al. .............. 348/128
4,573,190 A * 2/1986 Tsunoda et al. ............ 382/112
5,349,443 A * 9/1994 Guerra ........................ 356/600
5,517,575 A * 5/1996 Ladewski .................... 382/108
5,621,516 A * 4/1997 Shinzaki et al. .............. 356/71
5,729,348 A * 3/1998 Romano ...................... 356/417
6,024,020 A * 2/2000 Romano et al. ............ 101/484
6,832,550 B1 * 12/2004 Martin et al. ............ 101/349.1

FOREIGN PATENT DOCUMENTS

JP 2003270777 * 9/2003

* cited by examiner

*Primary Examiner*—Hoa Q. Pham
(74) *Attorney, Agent, or Firm*—Kirkpatrick & Lockhart Nicholson Graham LLP

(57) ABSTRACT

A method of assessing percentage dot in flexographic printing plates or the like includes superimposing the printing plate and a further, smooth surfaced sheet or plate of material of a reflective index greater than air, so that the "high" regions of the printing surface of the printing plate make intimate contact with the adjoining surface of said further plate. The superimposed sheet is illuminated in such a way that the difference in the light reflection between the areas of the further sheet which are not in intimate contact with the printing plate and those areas which are provide a significant difference in apparent brightness between the "high" regions and the "low" regions. The difference in apparent brightness can be detected by visual, automatic or photo detection means.

4 Claims, 1 Drawing Sheet

METHODS OF INSPECTING FLEXOGRAPHIC AND THE LIKE PRINTING PLATES

BACKGROUND OF THE INVENTION

THIS INVENTION relates to a method of assessing percentage dot in flexographic or the like printing plates formed of light-transmitting material, (typically transparent material).

It is known to use sheet plastics material for the manufacture of printing plates for certain purposes. In particular, some printing processes take advantage of the flexible nature of plastics materials and utilise so-called "flexographic" printing plates of flexible plastics material. Like printing plates of more conventional materials, such plastics printing plates comprise a printing surface formed by co-planar smooth "high" regions, and intervening "low" regions recessed below the level of said "high" regions. (The use of the term "co-planar" in this context is merely intended to mean that the surfaces in question are effectively flat having regard to the scale of the features concerned. Thus, for example, the "high" smooth surface portions may lie on a notional cylindrical or other curved surface, for example, where the flexographic plate passes around a drum or something of that sort).

In such plastics printing plates, the difficulty arises that it is not easy, from an ordinary visual inspection, either with the naked eye or by means of some optical instrument, to distinguish between the "high portions" which will produce a printing impression, and the "low" portions which will not. However, it is necessary to make such a distinction in order to assess and monitor, for example, manufacture of such printing plates, (which, in the case of flexographic printing plates may be carried out using computer-controlled apparatus to erode selected areas of a blank, instead of using the photographic techniques which are more conventional). In particular, it may be necessary to assess the so-called "percentage dot" in selected areas of such a printing plate, which determines the visual density of the printing in the region concerned.

The term "percentage dot" derives from the conventional half tone printing process in which tones between full black and full white are represented by a two-dimensional array of dots, the tone being determined by the size of the dots in relation to the spaces between dots. Where plastics printing plates are employed, the same principle may be applied, although the elements of the array are not necessarily dots but may be areas of different shapes, depending upon the apparatus used to form the plates or on other factors. The term "percentage dot" as used herein is, accordingly, intended to be understood in this wider sense.

SUMMARY OF THE INVENTION

It is among the objects of the present invention to provide techniques for rendering more visible the distinction between the high regions and low regions on a plastics printing plate such as a flexography printing plate, for example, to facilitate the determination of "percentage dot".

According to one aspect of the invention there is provided a method of rendering more visible the distinction referred to, for example to facilitate assessment of the "percentage dot" or equivalent of a selected area of a flexographic or the like printing plate of light-transmitting material, having a printing surface formed by co-planar smooth "high" surface regions and intervening "low" regions recessed below the level of said "high" surface regions, the method comprising (a) superimposing the printing plate and a further, smooth-surfaced sheet or plate of a material of a refractive index greater than air, so that the "high" regions of the printing surface of the printing plate make intimate contact with the adjoining surface of said further plate and (b) illuminating the superimposed sheets in such a way that the difference in light reflection between the areas of said further sheet which are not in intimate contact with the printing plate and those which are provides, to visual or automatic or photo-detection means, a significant difference in apparent brightness between the "high" regions and the "low" regions.

According to another aspect of the invention there is provided a method of rendering more visible the distinction referred to, for example to facilitate assessment of the "percentage dot" or equivalent of a selected area of a flexographic or the like printing plate of light-transmitting material, having a printing surface formed by co-planar smooth, "high" surface regions and intervening "low" regions recessed below the level of said "high" surface regions, the method comprising (a) applying to the printing surface of the plate an opaque or tinted material in a liquid or at least flowable form, to fill said intervening regions between said smooth "high" surface regions, (b) removing any surplus opaque or tinted material from said smooth "high" surface regions, (c) illuminating the printing plate carrying such opaque or tinted material, and using the difference in light-reflecting or light-transmitting properties between the material of the printing plate and said opaque or tinted material as the basis for discrimination between the high and low areas of the printing plates, for example for visual assessment of percentage dot.

BRIEF DESCRIPTION OF THE DRAWINGS

Embodiments of the invention are described below by way of example, with reference to the accompanying drawings in which.

DETAILED DESCRIPTION OF THE DRAWINGS

Figure 1:
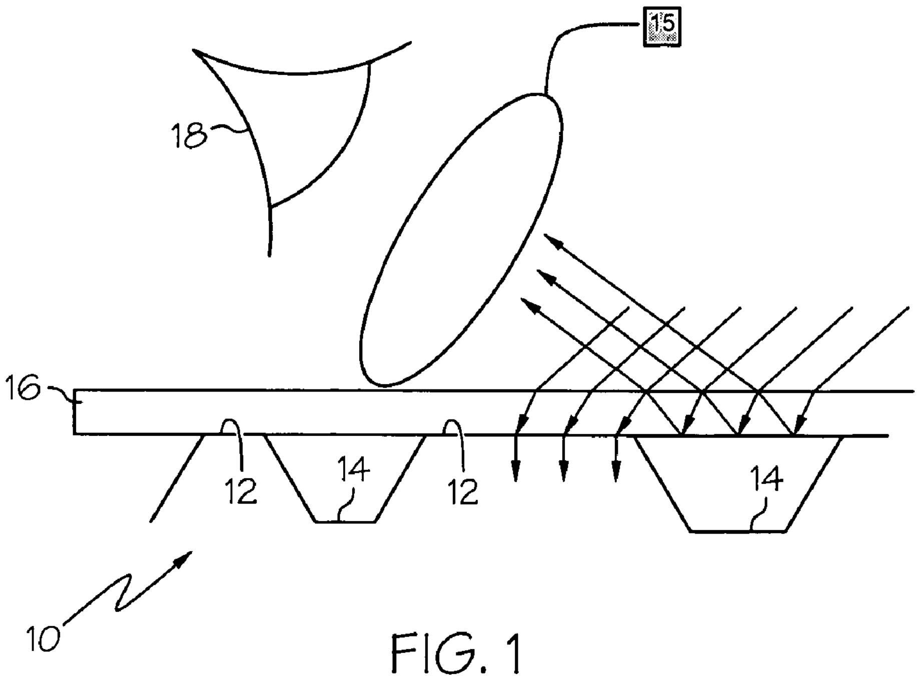
FIG. 1 is a schematic view in vertical section perpendicular to the plane of extension of the printing plate, illustrating the application of one method in accordance with the invention of assessing a printing plate.

In FIG. 1, reference 10 indicates a portion, (to a much enlarged scale), of a flexography printing plate. Only the printing side of the printing plate is shown, this comprising, in known manner, "high", co-planar smooth surface regions 12 to which, in use, the ink is applied, and intervening "low" regions 14.

The method illustrated in FIG. 1 uses the principle of internal reflection at a boundary between two light-transmitting materials of different refractive indices. A sheet 16 of transparent material of a higher refractive index than that of printing plate 10 is placed on the printing surface of the plate so that the lower, smooth surface of sheet 16 is in intimate contact with the "high" surface regions 12 of the printing plate 10. The superimposed sheet 16 and plate 10 are then illuminated by light from a light source, (not shown but represented schematically by the wording "light source" in the drawing). Viewing device 18 receives light through lens 15. The percentage of such light which is reflected internally in sheet 16 at its lower surface, (as illustrated) depends, inter alia, on the difference in refractive index between the material of sheet 16 and the medium directly below, so that where the medium directly below is air as it is directly above the "low" regions 14, a higher percentage of the light is reflected than from the regions in intimate contact with the "high" regions of plate 10, (where the medium directly below is the material of the plate 10). As a result the "high" regions of the plate 10 appear, to a viewing device 18, (represented as an eye, but which may, for example, be a device such as described in GB-A-2316741, for measuring percentage dot), to be significantly darker than the other regions. If the superimposed sheet 16 and plate 10 are illuminated by a collimated "parallel" beam directed at such an angle that total internal reflection just occurs in those regions above the "low" regions, the contrast in apparent brightness will be particularly pronounced, as all of the light striking the areas above the low regions 14 will be reflected whilst a significant part of the light striking areas above the high regions 12 will pass into and through the plate 10.

Figure 2:
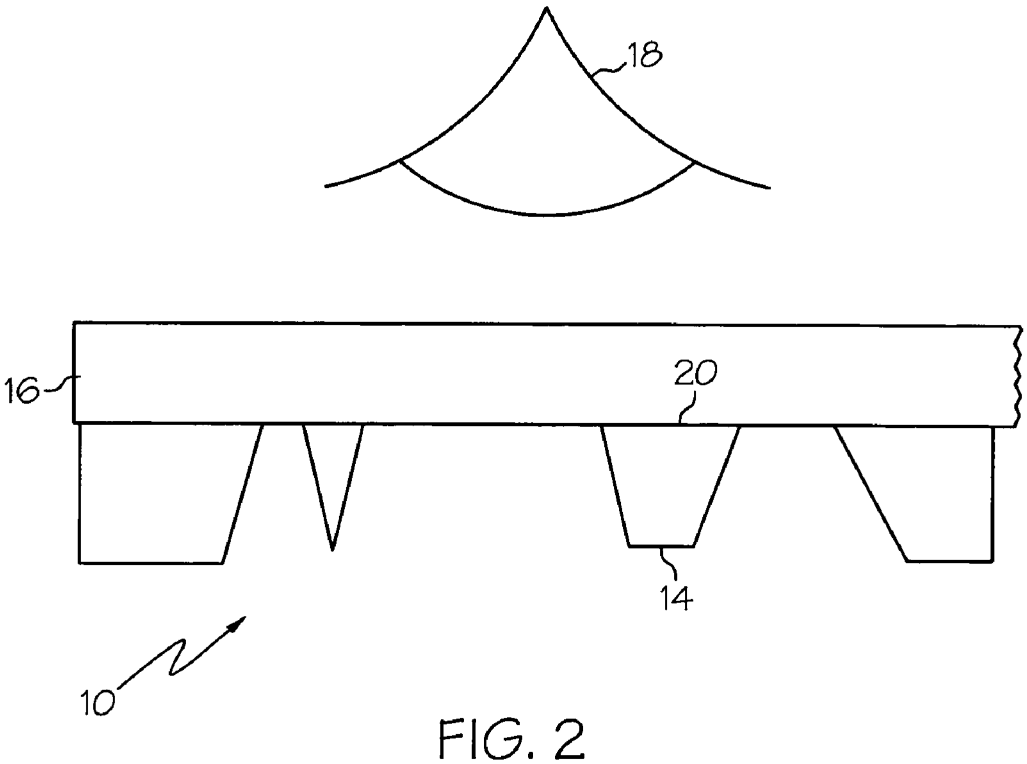
FIG. 2 is a corresponding view illustrating another method in accordance with the invention.

The method illustrated in FIG. 2 uses a liquid 20 to fill the wells defined in the surface of the plate 10 above the "low" regions 14. This liquid is selected so as to present a significant visual contrast to the material of the plate 10 in the conditions of viewing and illumination to be used. Thus, for example, the liquid may be either relatively non-reflective or relatively reflective compared to the material of the printing plate 10. The liquid may be tinted but light-transmitting to some extent or may be substantially opaque and light-coloured (light reflecting) or dark-coloured (light absorbing). Where the material of plate 10 is itself tinted or coloured, the liquid may simply be of a contrasting colour. In carrying out the method, the liquid is applied first to the printing side of plate 10 and then a sheet 16 of transparent material is placed on top of plate 10 to eliminate, or significantly reduce the depth of, the layer of liquid on the "high" regions of the plate leaving the recessed areas filled with the liquid. As a result, it is possible to take advantage of the contrast between the areas having a thick layer of liquid 20 and the areas having only a thin layer of liquid 20, or no liquid, to distinguish visually (or by means of an optical instrument such as described in GB-A-2316741), between the "high" and "low" regions of the printing side of the plate. It will be understood that some liquid remaining on the "high" regions, i.e. sandwiched between the "high" regions and the underside of plate 16 will be tolerable provided that, at the thickness of the (minimal) gap between the plate 16 and said "high" regions, the liquid is substantially transparent.

Whilst in FIGS. 1 and 2, the viewing device 18 is arranged to receive light reflected from the plate 10/sheet 16 combination, and is thus disposed on the same side of that combination as the light source, where the plate 10 is transparent, the viewing device 18 may be disposed on the opposite side of the plate 10/sheet 16 combination, to receive light transmitted through that combination.

The viewing device 18 used in the methods of FIGS. 1 and 2, may, as noted, be a device such as described in GB-A-2316741, or may be such a device with some modification for operation with light emerging at an angle from the plate being inspected.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of rendering more visible the distinction between "high" regions and "low" regions of a printing plate, the printing plate having a printing surface formed by co-planar smooth "high" surface regions and intervening "low" regions recessed below the level of said "high" surface regions comprising:

superimposing the printing plate and a smooth surfaced material having a refractive index greater than air, so that the "high" regions of the printing surface of the printing plate make intimate contact with the adjoining surface of said smooth surfaced material;

illuminating the superimposed printing plate and smooth surfaced material;

measuring a reflected light from the superimposed printing plate and smooth surfaced material; and determining a percentage dot of the printing plate.

2. The method of claim 1 further comprising:

detecting from the measured light the "high" regions of the printing surface.

3. The method of claim 2 where the step of illuminating the superimposed printing plate and smooth surfaced material comprises illuminating the superimposed printing plate and smooth surfaced material with a collimated parallel beam.

4. The method of claim 3 where the collimated parallel beam is directed at an angle such that the total internal reflection occurs in regions above the "low" regions.

* * * * *